W. ADRIANCE.
Horse Hay-Rake.

No. 198,328.                    Patented Dec. 18, 1877.

Witnesses.                              Inventor.
Otto Hufeland.                    Walter Adriance
Hugo Brueggemann                         by
                              Van Santvoord & Hauff
                                     his attorneys

N. PETERS, PHOTO-LITHOGRAPHER, WASHINGTON, D. C.

UNITED STATES PATENT OFFICE.

WALTER ADRIANCE, OF POUGHKEEPSIE, NEW YORK.

IMPROVEMENT IN HORSE HAY-RAKES.

Specification forming part of Letters Patent No. 198,328, dated December 18, 1877; application filed October 13, 1877.

*To all whom it may concern:*

Be it known that I, WALTER ADRIANCE, of Poughkeepsie, in the county of Dutchess and State of New York, have invented a new and useful Improvement in Horse-Rakes, which improvement is fully set forth in the following specification, reference being had to the accompanying drawings, in which—

Figure 1:
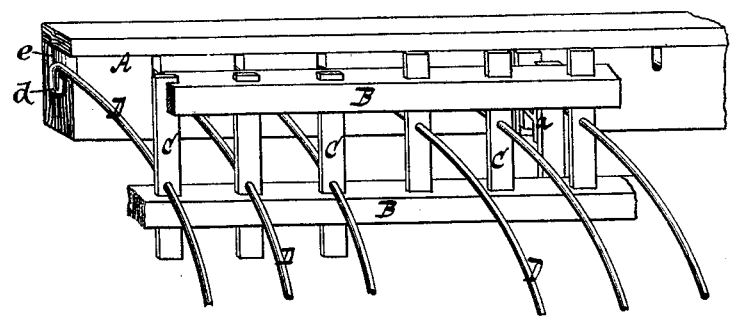
Figure 2:
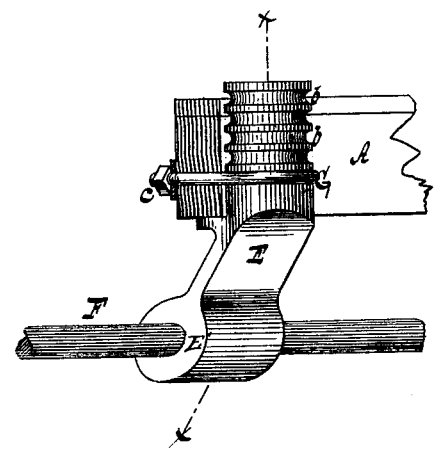
Figure 3:
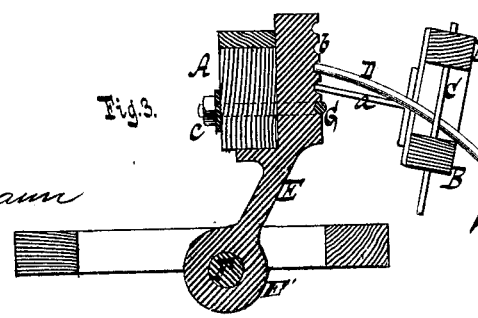

Figure 1 represents a sectional perspective view of a rake-head containing my improvement. Fig. 2 is a similar view, showing the arm by which the head is connected to the axle. Fig. 3 is a cross-section in the plane $x\,x$, Fig. 2.

Similar letters indicate corresponding parts.

This invention relates to certain improvements in horse-rakes.

It consists in the combination, with a rake-head, of two parallel bars attached at one side of the same, a series of loose slides arranged to move transversely in said bars, which guide them at their upper and lower ends, and rake-teeth swinging in the rake-head and passing through apertures in the transverse slides between the two parallel bars, as will more fully hereinafter appear.

It consists, further, in the combination of a rake-tooth, which is bent at its inner end to form a loop, with a rake-head having a vertical recess adapted to receive said tooth, so that the latter is permitted to swing up and down, and at the same time is firmly attached to the head.

In the drawings, the letter A designates a rake-head, to one side of which are affixed two bars, B B, through the medium of arms $a$, these bars being so arranged that they extend parallel to the head. C designates a series of slides, which extend transversely through the bars B B, the latter being provided with holes for the passage thereof. The slides C are placed loosely in their holes, and through an aperture formed in each of them extends a tooth, D, which swings in the rake-head A.

These teeth D can be connected to the head A in various ways, and in Fig. 1 I have shown one method of effecting this object, the teeth being in all cases so arranged that they are capable of vibrating, and thus clearing any obstructions that may be presented thereto in the passage of the rake over the ground. When the teeth D are vibrated the slides C partake of their motion, and move up and down, and by this means the teeth are guided and a lateral motion thereof is effectually prevented.

The letter E designates an arm by which the rake-head A is supported on the axle F of a horse hay-rake. The upper part of this arm E has the form of a segment in cross-section, and the flat side thereof is placed against the rake-head A, while its round portion is embraced by a clevis, G, the two ends of which are made to pass through the rake-head A, and are fastened by nuts $c$. By the clevis G the arm E is very firmly fastened to the rake-head, while I am enabled to dispense with the screw-bolt usually employed for this purpose, and thus leave the arm in solid condition.

By using the clevis, moreover, I am enabled to change the position of the arm, so that the rake-head A can be brought to a greater or less distance from the axle F, as the case may be, and the extent to which the rake-head is allowed to be raised for the purpose of gathering the load can be regulated for either hay or stubble.

The arm E is preferably provided on its upper part with a series of notches, $b$, into one of which the bight of the clevis G is made to catch, the object of this arrangement being to more effectually hold the arm in place, the use of a series of notches, moreover, permitting of changing the position of the arm for the purpose stated.

The method of securing the rake-teeth D in the head A consists in bending the teeth at their inner ends to form a loop, $d$, and inserting the loops in recesses $e$ made for this purpose in the head, as seen in Fig. 1. In order to permit of inserting the loops $d$ in their recesses, the rake-head A is made in two parts, the recesses being made in the lower part, and the upper part being removed during the time the loops are put in place, and for the passage of the shanks of the teeth notches are cut in the upper edge of said lower part of the rake-head adjacent to the recesses $e$, as clearly shown. The loops $d$ permit of a vibratory motion of the rake-teeth, and at the same time hold the teeth very firmly in position.

What I claim as new, and desire to secure by Letters Patent, is—

1. The combination, with a rake-head, of parallel bars attached at one side of the same, a series of loose slides arranged to move transversely in the said bars, which guide them at their upper and lower ends, and rake-teeth swinging in the rake-head and passing through apertures in the transverse slides between the parallel bars, substantially as and for the purpose described.

2. The combination of a rake-tooth, bent at its inner end to form a loop, with a rake-head having a vertical recess adapted to receive said loop, substantially as and for the purpose described.

In testimony that I claim the foregoing I have hereunto set my hand and seal this 11th day of October, 1877.

WALTER ADRIANCE. [L. S.]

Witnesses:
 ROBT. N. PALMER,
 JOHN HAMILTON.